United States Patent [19]
Austel et al.

[11] Patent Number: 5,546,516
[45] Date of Patent: Aug. 13, 1996

[54] SYSTEM AND METHOD FOR VISUALLY QUERYING A DATA SET EXHIBITED IN A PARALLEL COORDINATE SYSTEM

[75] Inventors: Vernon Austel, Ossining; Avijit Chatterjee, Croton-On-Hudson, both of N.Y.; Alfred Inselberg, Ra'Anana, Israel

[73] Assignee: International Business Machines Corporation, Armonk, N.Y.

[21] Appl. No.: 355,848

[22] Filed: Dec. 14, 1994

[51] Int. Cl.$^6$ ..................... G06T 11/00
[52] U.S. Cl. .............. 395/140; 395/155; 395/161
[58] Field of Search ...................... 395/140, 119, 395/155–161; 382/113; 434/322, 323, 336, 350

[56] References Cited

U.S. PATENT DOCUMENTS

| | | | |
|---|---|---|---|
| 4,823,272 | 4/1989 | Inselberg | 364/461 |
| 5,257,345 | 10/1993 | Malm | 395/119 |

OTHER PUBLICATIONS

Human–Machine Interactive Systems, Plenum Publishing Corporation, 1991 –"Parallel Coordinates A Tool for Visualizing Multivariate Relations" –Alfred Inselberg and Bernard Dimsdale –pp. 199–233.

Proceedings Reprint SPIE –The International Society for Optical Engineering –Reprinted from "Human Vision, Visual Processing, and Digital Display IV", 1–4 Feb. 1993, –San Jose CA. vol. 1913.

IBM Los Angeles Scientific Center, 1987–2811, Jul. 1987 –Exploratory Data Analysis in Parallel Coordinates –T. Chomut.

*Primary Examiner*—Almis R. Jankus
*Attorney, Agent, or Firm*—Ohlandt, Greeley, Ruggiero & Perle

[57] ABSTRACT

A multi-variate data set is displayed in a plurality of multi-dimensional presentations on a computer having a graphical interface and a keyboard input. The data set includes a plurality of independent variables and, for each independent variable, a plurality of dependent variables. A computer displays the data set in parallel coordinate form on the graphical interface so that each dependent variable of the data set is presented as a series of values along an axis, plural axes arranged in parallel. The graphical interface provides a polygonal line which connects a value on each parallel axis and illustrates a relationship between an independent variable and the dependent variables appearing on each axis. The user input enables a user to superimpose on the graphical interface graphical delimiters either on or between two succeeding parallel axes. The graphical delimiters identify a data subset that includes at least one independent variable and adjacent dependent variables. In response to placement of the graphical delimiters, the computer modifies a presentation of any polygonal lines connecting the adjacent dependent variables and which lies between the graphical delimiters, and differentiates then from other polygonal lines which represent remaining data subsets of the data set. The computer further enables an illustration of the delimited data subset in Cartesian coordinates.

13 Claims, 9 Drawing Sheets

Meat  Pigs  Eggs  Milk  Fish  Crls  SFds  Nuts  Frts $c_1 x_1 + c_2 x_2 \leqq c_0$ $c_1 x_1 + c_2 x_2 \leqq c_0$

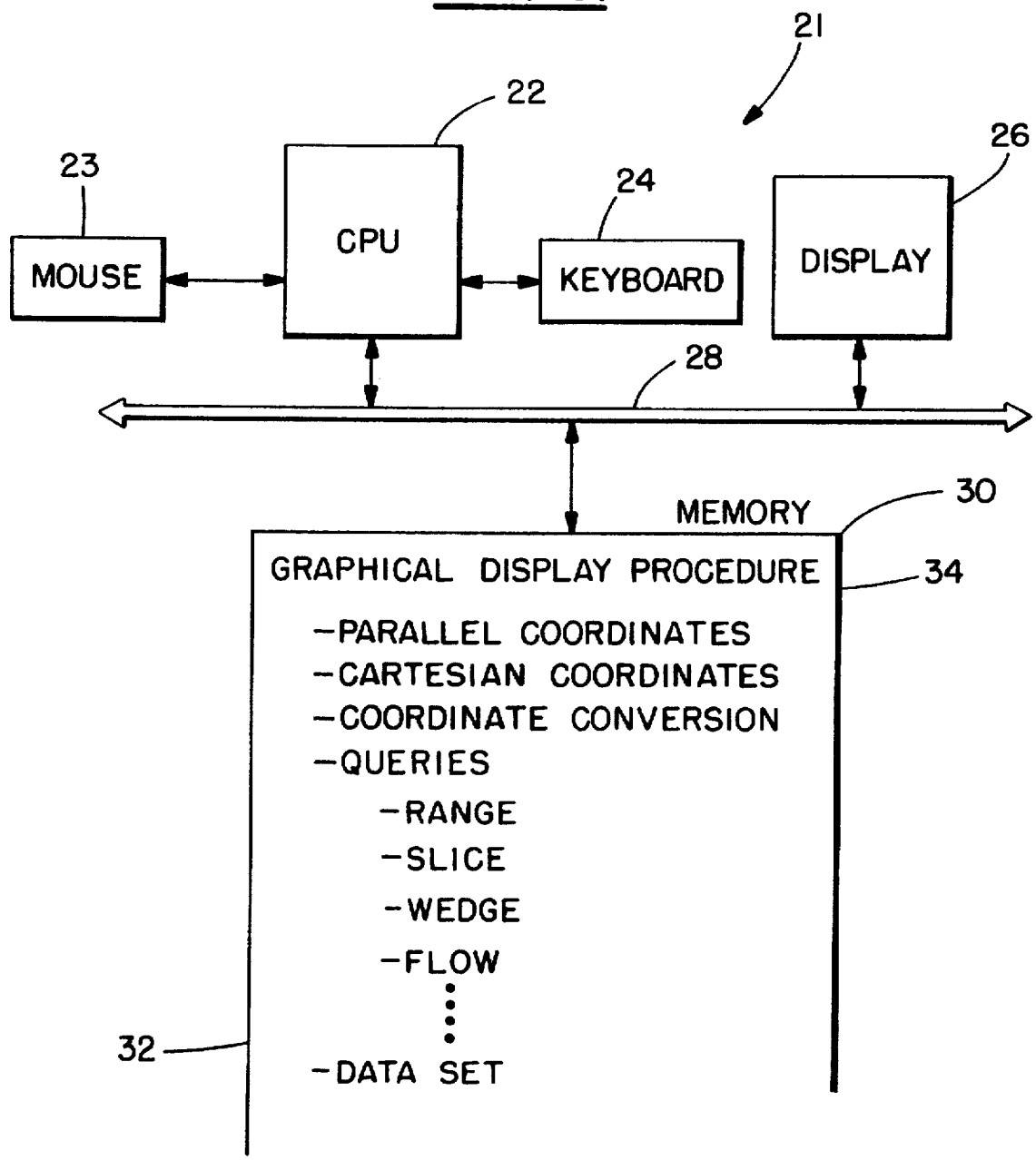

SYSTEM AND METHOD FOR VISUALLY QUERYING A DATA SET EXHIBITED IN A PARALLEL COORDINATE SYSTEM

FIELD OF THE INVENTION

This invention relates to the visualization of a data set in a parallel coordinate system and, more particularly, to a system and method for segregating a subset of a displayed data set so that it can be discriminated from other data and/or shown in an alternate coordinate system.

BACKGROUND OF THE INVENTION

The Cartesian coordinate system enables a visualization of two and three dimensional data and interrelationships therebetween. When, however, a data set exceeds three dimensions, special presentations have been developed to enable its presentation. Such a data set is termed multi-variate and may include a relatively large number of variables, with each variable having a large number of data points. Merely looking at the data points, per se, reveals little or no information concerning trends or correlations. Analysis of the data, as it stands, to uncover interrelationships by using traditional statistical methods is both tedious and time consuming.

Inselberg et al. have developed a system for displaying multi-variate data sets on a system of parallel coordinates which enables a visualization of a data set in such a manner as to enable the viewer to arrive at an understanding of interrelationships therebetween. (See "Parallel Coordinates: Survey Of Recent Results" SPIE vol 1913, pages 582–599 1993). A parallel coordinate system comprises a series of parallel lines that are placed equidistantly and perpendicular to the x-axis of a coincident Cartesian coordinate system. The initial parallel coordinate is normally placed coincident with the y Cartesian axis. Each parallel axis is assigned a specific dependent variable and dependent variable values are plotted along the respective axis. The independent variable is represented by a polygonal line which connects the corresponding dependent variable values relating to the independent variable. In short, a mapping occurs between N-dimensional and two dimensional sets of data for any value of N. The two dimensional sets of data are represented by adjacent, succeeding parallel axes.

The parallel coordinate system will be better understood by referring to Table 1 below which, as an example, plots per capita protein consumption in 25 European countries (grams per head per day).

TABLE 1

| | European protein consumption (grams per head per day) | | | | | | | |
|---|---|---|---|---|---|---|---|---|
| | Meat | Pigs | Eggs | Milk | Cereals | Starchy Foods | Nuts Pulses | Fruits Vegs |
| Albania | 10.1 | 1.4 | 0.5 | 8.9 | 0.2 | 42.3 | 0.6 | 5.5 |
| Austria | 8.9 | 14.0 | 4.3 | 19.9 | 2.1 | 28.0 | 3.6 | 1.3 |
| Belgium | 13.5 | 9.3 | 4.1 | 17.5 | 4.5 | 26.6 | 5.7 | 2.1 |
| Bulgaria | 7.8 | 6.0 | 1.6 | 8.3 | 1.2 | 56.7 | 1.1 | 3.7 |
| Czechoslovakia | 9.7 | 11.4 | 2.8 | 12.5 | 2.0 | 34.3 | 5.0 | 1.1 |
| Denmark | 10.6 | 10.8 | 3.7 | 25.0 | 9.9 | 21.9 | 4.8 | 0.7 |
| E. Germany | 8.4 | 11.6 | 3.7 | 11.1 | 5.4 | 24.6 | 6.5 | 0.8 |
| Finland | 9.5 | 4.9 | 2.7 | 33.7 | 5.8 | 26.3 | 5.1 | 1.0 |
| France | 18.0 | 9.9 | 3.3 | 19.5 | 5.7 | 28.1 | 4.8 | 2.4 |
| Greece | 10.2 | 3.0 | 2.8 | 17.6 | 5.9 | 41.7 | 2.2 | 7.8 |
| Hungary | 5.3 | 12.4 | 2.9 | 9.7 | 0.3 | 40.1 | 4.0 | 5.4 |
| Ireland | 13.9 | 10.0 | 4.7 | 25.8 | 2.2 | 24.0 | 6.2 | 1.6 |
| Italy | 9.0 | 5.1 | 2.9 | 13.7 | 3.4 | 36.8 | 2.1 | 4.3 |
| Netherlands | 9.5 | 13.6 | 3.6 | 23.4 | 2.5 | 22.4 | 4.2 | 1.8 |
| Norway | 9.4 | 4.7 | 2.7 | 23.3 | 9.7 | 23.0 | 4.6 | 1.6 |
| Poland | 6.9 | 10.2 | 2.7 | 19.3 | 3.0 | 36.1 | 5.9 | 2.0 |
| Portugal | 6.2 | 3.7 | 1.1 | 4.9 | 14.2 | 27.0 | 5.9 | 4.7 |
| Romania | 6.2 | 6.3 | 1.5 | 11.1 | 1.0 | 49.6 | 3.1 | 5.3 |
| Spain | 7.1 | 3.4 | 3.1 | 8.6 | 7.0 | 29.2 | 5.7 | 5.9 |
| Sweden | 9.9 | 7.8 | 3.5 | 24.7 | 7.5 | 19.5 | 3.7 | 1.4 |
| Switzerland | 13.1 | 10.1 | 3.1 | 23.8 | 2.3 | 25.6 | 2.8 | 2.4 |
| United Kingdom | 17.4 | 5.7 | 4.7 | 20.6 | 4.3 | 24.3 | 4.7 | 3.3 |
| USSR | 9.3 | 4.6 | 2.1 | 16.6 | 3.0 | 43.6 | 6.4 | 3.4 |
| W. Germany | 11.4 | 12.5 | 4.1 | 18.8 | 3.4 | 18.6 | 5.2 | 1.5 |
| Yugoslavia | 4.4 | 5.0 | 1.2 | 9.6 | 0.6 | 55.9 | 3.0 | 5.7 |

The parallel coordinate representation of data shown in Table 1 is illustrated in FIG. 1 wherein each country is represented by a polygonal line and each parallel coordinate axis measures a different protein consumption. By following each polygonal line from coordinate axis to coordinate axis, the pattern of protein consumption for each country (i.e., independent variables) can thus be visualized and interrelationships determined.

FIG. 1 is representative of one presentation of dependent variables along the parallel coordinate axes and those skilled in the art will realize that many dependent variable presentations are available for different independent variable inputs. FIG. 1 illustrates, however, that a parallel coordinate system can become "crowded" when a multiplicity of independent variables are presented. A method is needed for differentiating specific independent variables that are shown on a parallel coordinate presentation. Further, the relationship of polygonal lines on a parallel coordinate system to a Cartesian coordinate representation of adjacent, related data is not immediately apparent to the unsophisticated user. While it is known that a pair of adjacent, parallel coordinate axes in the parallel coordinate system have a direct transformation into the Cartesian coordinate system, the Cartesian coordinate representation is often unexpected.

In FIGS. 2–5 corresponding Cartesian and parallel coordinate data sets are indicated. In FIG. 2, a line 10 is shown having a positive slope which passes through data points a and b. Data point a has a coordinate value of $x_1$, $x_2$ and data point b has a coordinate value of $x_3$, $x_4$. In FIG. 2a, parallel coordinates are illustrated showing of the cartesian representation of FIG. 2. Note that point b in FIG. 2 appears in the parallel coordinate system of FIG. 2a as a polygonal line extending between parallel coordinate axes $X_1$ and $X_2$, between coordinate values $x_3$ and $x_4$, respectively. In a similar fashion, data point a in FIG. 2 appears as a polygonal line extending between parallel coordinate axes $X_1$ and $X_2$ between data values $x_1$ and $x_2$. Note that the point of interception between lines a and b in FIG. 2a is external to the space between parallel coordinate axes X1 and X2.

In FIG. 3, a negatively sloping line 12 is shown between data points a and b. Note that in FIG. 3a, the line corresponding to point a in FIG. 3 extends between parallel coordinate axes X1 and X2 between values $x_1$ (on parallel axis $X_1$) to value $x_2$ (on parallel coordinate axis $X_2$). In a similar fashion, point b in FIG. 3 is represented by a line between values $x_3$ and $x_4$ on parallel coordinate axes $X_1$, $X_2$, respectively. Intersection point 13 between lines a and b in FIG. 3a defines the data point in the parallel coordinate system which represents line 12 in the Cartesian coordinate system of FIG. 3. Thus, it can be seen that a point in the Cartesian coordinate system is represented as a line in the parallel coordinate system and vice-versa.

In FIG. 4, a pair of parallel lines 14 and 15 are illustrated in the Cartesian coordinate system. The representation of data points a, b, c and d in the parallel coordinate system are shown in FIG. 4a. Note that the points of intersection 16 and 17, respectively between polygonal lines a, b and between c, d are vertically aligned and positioned between axes X1 and X2—illustrating that parallel lines 14 and 15 have negative slopes. If parallel lines 15 and 16 had positive slopes, points of intersection 16, 17 would be aligned but would be external to the space between axes X1 and X2.

In FIG. 5, a line 19 between points a and b and the adjacent parallel dotted lines are represented by the equation $C_1x_1+C_2x_2 \leq C_O$. That equation defines a "half space" that includes and is below line 19. In FIG. 5a, the intersection of polygonal lines a and b illustrate a point ab that is representative of line 19 in FIG. 5. The remaining intersection points 20 are representative of each of the parallel dashed lines within the half space of FIG. 5.

From a review of FIGS. 2–5, it can be seen that the unsophisticated user will initially have difficulty in making a transition between data set values shown in a parallel coordinate system and the same data set values shown in a Cartesian coordinate system.

Accordingly, it is an object of this invention to provide a graphical interface that enables a user to select and emphasize a specific subset of data values shown in a parallel coordinate system.

It is another object of this invention to provide a graphical interface which enables the user to select a subset of data points shown in a parallel coordinate system and to automatically illustrate the subset of data points in a Cartesian coordinate system.

It is another object of this invention to provide a graphical interface which enables a user to select a variety of data subsets that are shown in a parallel coordinate system for either individual visualization or translation to a further coordinate system.

SUMMARY OF THE INVENTION

A multi-variate data set is displayed in a plurality of multi-dimensional presentations on a computer having a graphical interface and a keyboard input. The data set includes a plurality of independent variables and, for each independent variable, a plurality of dependent variables. A computer displays the data set in parallel coordinate form on the graphical interface so that each dependent variable of the data set is presented as a series of values along an axis, plural axes arranged in parallel. The graphical interface provides a polygonal line which connects a value on each parallel axis and illustrates a relationship between an independent variable and the dependent variables appearing on each axis. The user input enables a user to superimpose on the graphical interface graphical delimiters either on or between two succeeding parallel axes. The graphical delimiters identify a data subset that includes at least one independent variable and adjacent dependent variables. In response to placement of the graphical delimiters, the computer modifies a presentation of any polygonal lines connecting the adjacent dependent variables and which lie between the graphical delimiters, and differentiates them from other polygonal lines which represent remaining data subsets of the data set. The computer further enables an illustration of the delimited data subset in Cartesian coordinates.

BRIEF DESCRIPTION OF THE DRAWINGS

FIG. 2 illustrates a parallel coordinate representation of the plot of FIG. 2.

FIG. 6 is a block diagram of a computer system particularly adapted to carry out the invention.

DETAILED DESCRIPTION OF THE INVENTION

Figure 1:
FIG. 1 is a prior art showing of a parallel coordinate system which plots protein consumption from various protein sources for 25 European countries.
Figure 2:
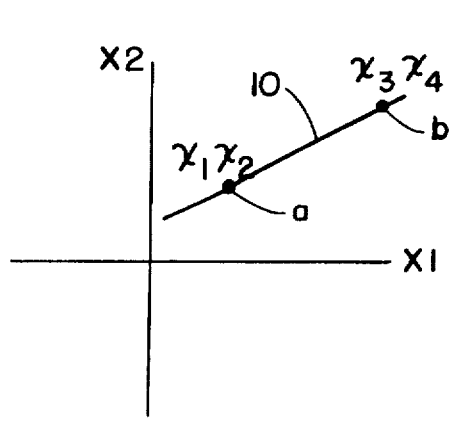
FIG. 2 illustrates a Cartesian coordinate plot of a positively sloped line extending between two data points.
Figure 2A:
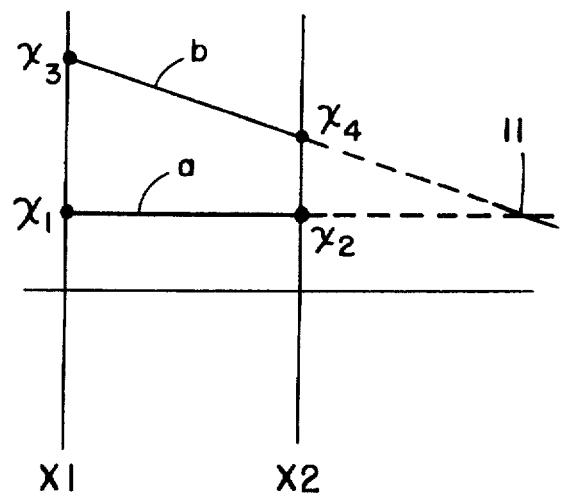
Figure 3:
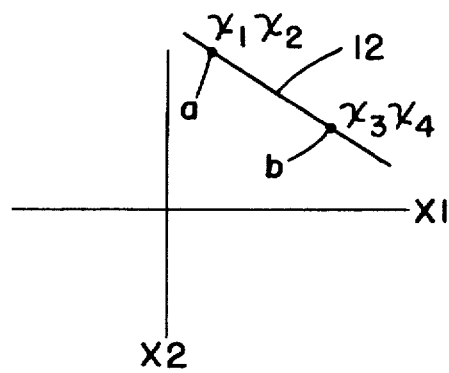
FIG. 3 illustrates a Cartesian coordinate of a negatively sloped line extending between two data points.
Figure 3A:
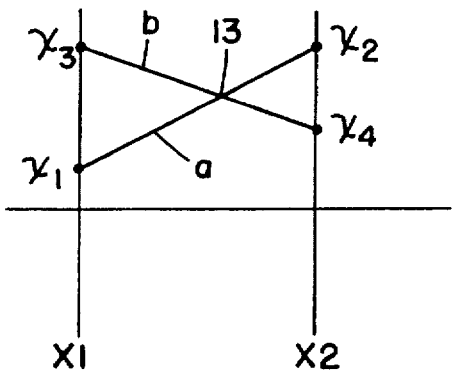
FIG. 3a illustrates a parallel coordinate representation of the plot of FIG. 3.

FIG. 6 is a block diagram of a computer system that is particularly adapted to enable user inputted queries to a data set displayed in a parallel coordinate form. Computer system 21 includes a central processing unit 22, a mouse 23 and an attached keyboard 24. A graphical display 26 is interconnected to CPU 22 via a bus system 28. A memory 30 is connected to CPU 22 via bus system 28 and includes a plurality of procedures for enabling a data set 32 stored therein to be presented on graphical display 26 in a number of multi-dimensional coordinate formats.

A graphical display procedure 34 is stored within memory 30 and comprises the following sub-procedures: a parallel coordinate display procedure, a Cartesian coordinate display procedure, a coordinate conversion procedure, and at least four user invoked query procedures, i.e., Range, Slice, Wedge and Flow. The parallel coordinate display procedure enables data set 32 to be illustrated on display 26 in a format similar to that shown in FIG. 1. The Cartesian coordinate display procedure enables the same data set 32 to be shown in Cartesian form, but only shows a pair of "adjacent" dependent variables and their relationship to an independent variable. Adjacent dependent variables are shown are those plotted on a pair of succeeding parallel coordinate axes.

The parallel coordinate display procedure enables display of N dependent variables and illustrates their relationship to M independent variables. However, in doing so, the parallel coordinate display is apt to become "crowded", with the user being unable to discretely analyze particular subsets of the exhibited data. Furthermore, it is desirable to enable the user to convert pairs of dependent variables shown in a parallel coordinate system to Cartesian coordinate form and vice-versa. This procedure is enabled by the coordinate conversion procedure and the four query subprocedures Range, Slice, Wedge and Flow.

Turning to the remaining figures, each of the query subprocedures will be described in relation to a portion to the parallel coordinate display shown in FIG. 1.

RANGE

Figure 7:
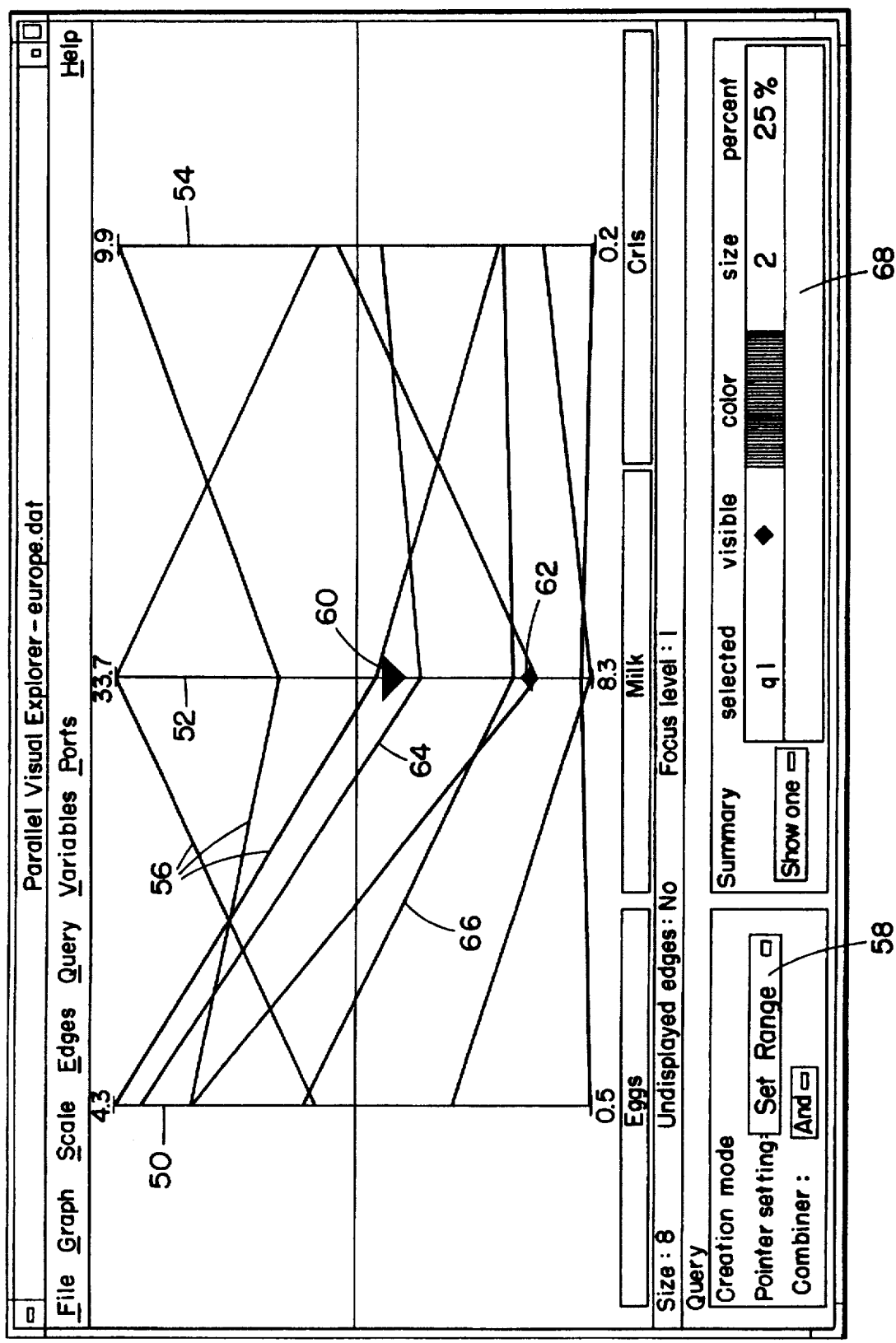
FIG. 7 is a display which illustrates a portion of the parallel coordinate plot of FIG. 1 and shows a superimposed, user-initiated Range query which causes selection of a data subset from the data set.

The parallel coordinate plot shown in FIG. 7 includes three axes 50, 52 and 54 on which dependent variables are plotted. Axis 50 has arrayed thereon values of egg consumption of from 0.5 grams per day to 4.3 grams per day. Axis 52 relates to milk and has values which vary from 8.3 grams per day to 33.7 grams per day. Axis 54 relates to cereals and has values plotted thereon of from 0.2 grams per day to 9.9 grams per day. Each polygonal line 56 is a line which connects consumption values on each of axes 50, 52 and 54 for a particular country (i.e., an independent variable).

To enable a user to highlight and differentiate one or more polygonal lines from the remaining polygonal lines in FIG. 7, a Range query function is provided. As shown by box 58, a user is enabled to select from a menu, a "set range" command, which, when clicked by operation of either a key on keyboard 24 or a mouse, enables placement of a pair of graphical delimiters 60 and 62 on one of axes 50, 52 or 54. Each graphical delimiter 60 and 62 is shown in the form of an arrowhead with the tip of each arrowhead coincident with a specific value plotted on axis 52. The directions in which the arrowheads point and the distance therebetween denote the span of the Range query. Thus as shown in FIG. 7, the tips of arrows 60 and 62 define a range of values of milk consumption.

In response to a user positioning arrows 60 and 62 on an axis and then enabling the "set range" function, polygonal lines 64 and 66 (which intersect axis 52 within the established range) are highlighted either by color change or by another graphical differentiation artifact. Any polygonal line which does not pass within the range defined by the tips of arrows 60 and 62 remains unchanged. Box 68 at the lower right of FIG. 7 enables user selection of the particular color, size, etc. to be attributed to the emphasized polygonal lines.

The Range query is restricted to a selection of values on a specific axis within the parallel coordinate display. Recall that each of polygonal lines 56 is, when configured in Cartesian coordinates, a point in space between orthogonally oriented axes containing plotted values that appear on parallel coordinate axes 50 and 52. Assume the user wishes to examine a Cartesian coordinate plot of the relationship of the dependent variables plotted on parallel coordinate axes 50 and 52, for each of the independent variables represented by polygonal lines 64, 66. The user invokes a Cartesian coordinate display procedure which, in combination with the coordinate conversion function enables the presentation shown in FIG. 8.

Figure 8:
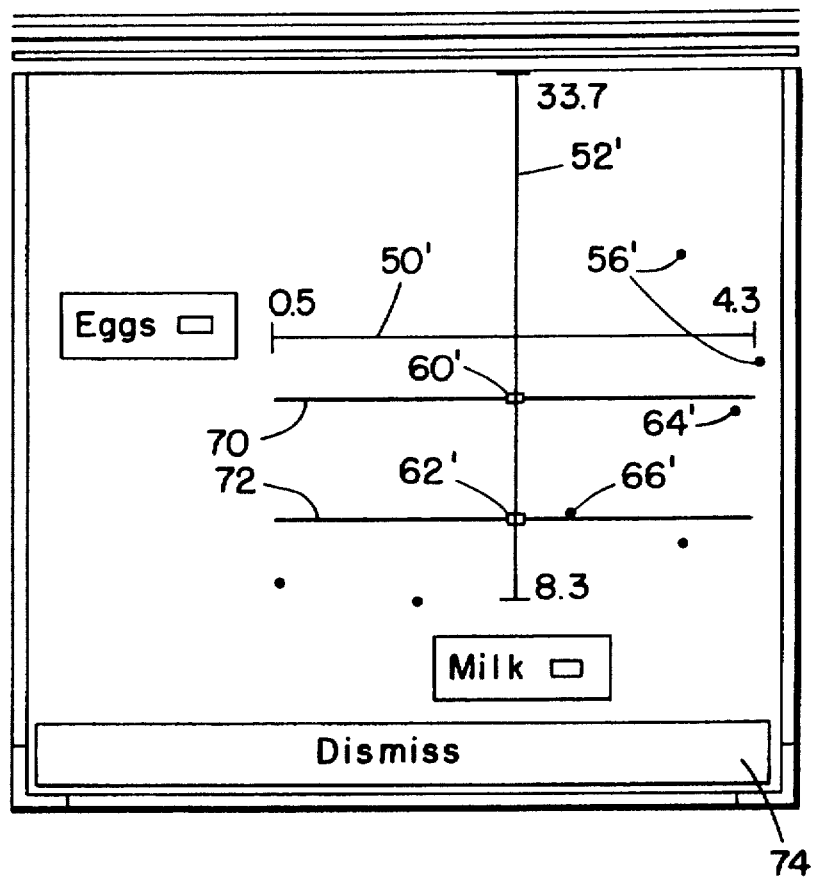
FIG. 8 is a Cartesian coordinate plot showing the data subset selected by the range query of FIG. 7.

In FIG. 8, each display feature which corresponds to a display feature in FIG. 7 is illustrated by an identical number, followed by a prime. Y axis 52' plots milk consumption values and X axis 50' plots egg consumption values. Point 60' on Y axis 52' is the upper value of the selected range in FIG. 7 and point 62' is the lower value of the range selected in FIG. 7. Lines 70 and 72 are, respectively, constructions which illustrate in the Cartesian coordinate plot, the range of points encompassed by the Range span between arrows 60 and 62 in FIG. 7. The Cartesian plot thus shows that data point 56' fall outside of the range, whereas data points 64' and 66' fall within the range. Data points 64' and 66' may be displayed in another color or by using a different graphical presentation to emphasize them from the remaining data points. A user's clicking on the dismiss box 74 enables a return to the parallel coordinate view of FIG. 7.

Mathematically, the Range query can be expressed as follows:

$$C_1 \leq X1 \leq C_2$$

where
$C_2$=maximum value of Range
$C_1$=minimum value of Range
X1=dependent variable data subset

SLICE

A user may wish to examine an area of a parallel coordinate plot between a pair of parallel coordinate axes.

Assume first that the user wishes to highlight a plurality of polygonal lines falling within a "slice" of values in the parallel coordinate plot. As will be hereafter understood, a slice corresponds to two parallel lines on a Cartesian coordinate plot which bound a data subset that is to be selected. The slice data subset is defined by placing arrows 80 and 82 (which are always positioned along an imaginary vertical line 84) somewhere between a pair of adjacent parallel coordinate axes (e.g., 50, 52) When arrows 80 and 82 are positioned along imaginary line 84 at a distance apart which defines the desired span of the Slice, the set Slice indication is clicked and all polygonal lines 86 which pass between arrows 80 and 82 are highlighted or otherwise emphasized.

Figure 4:
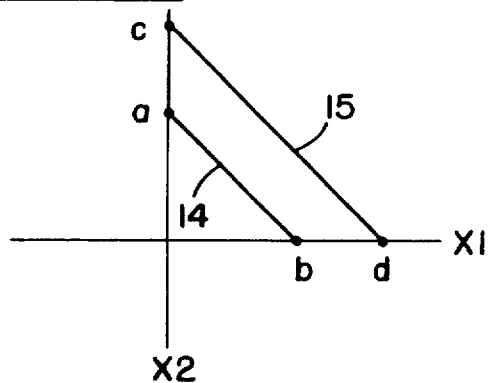
FIG. 4 illustrates a Cartesian coordinate plot of a pair of parallel lines extending between plot of FIG. 4.
Figure 4A:
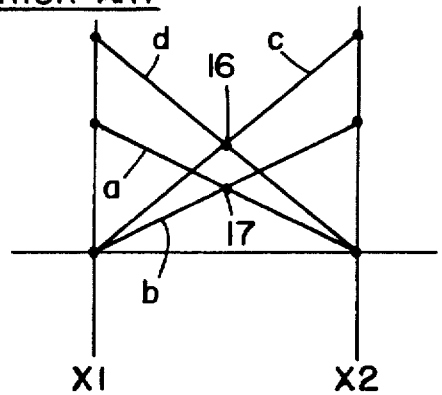
FIG. 4a illustrates a parallel coordinate representation of the plot of FIG. 4.
Figure 5:
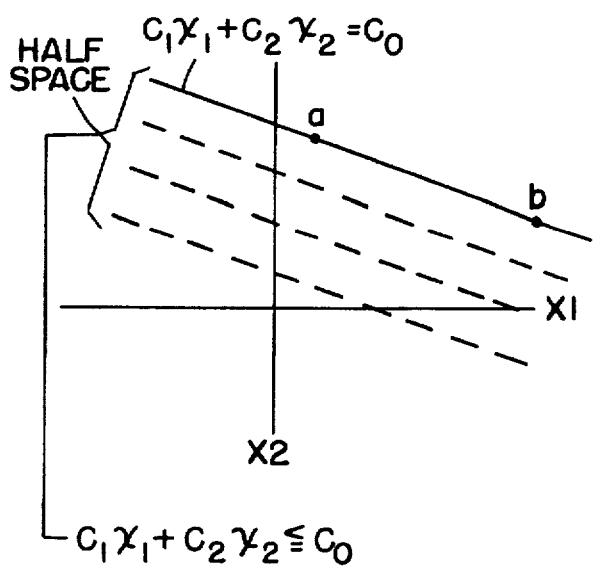
FIG. 5 illustrates a Cartesian coordinate plot of a negatively sloped line extending between two data points and additional parallel lines which fall in a half space adjacent the negatively sloped line.
Figure 5A:
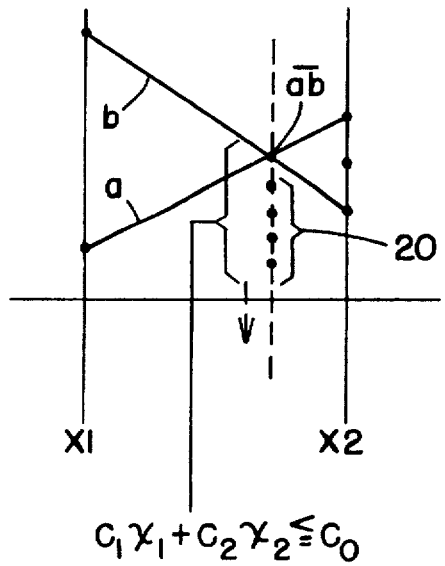
FIG. 5a illustrates a parallel coordinate representation of the plot of FIG. 5.
Figure 10:
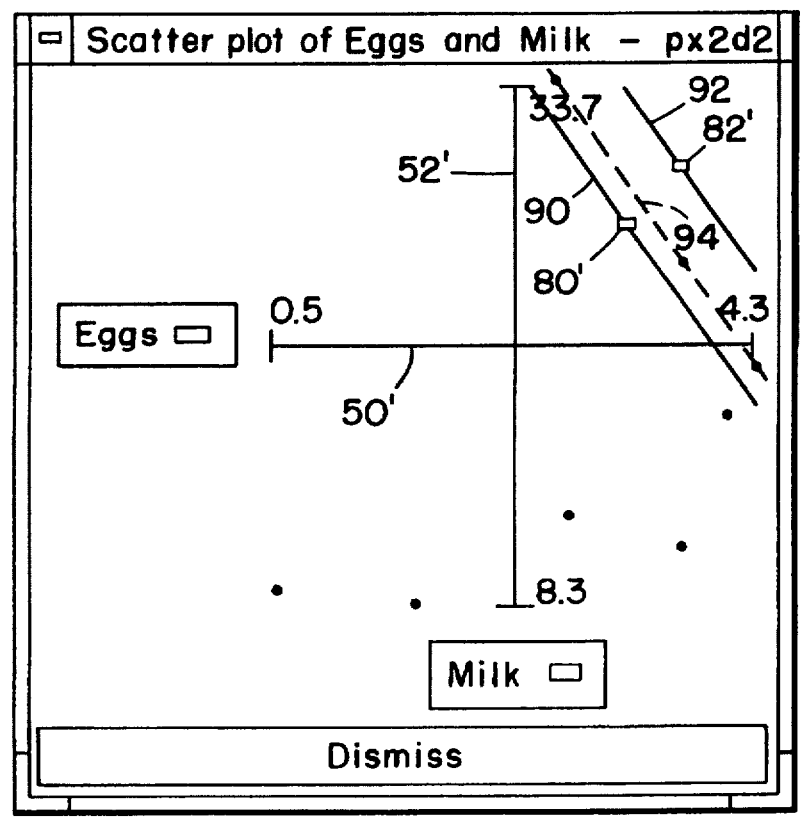
FIG. 10 is a Cartesian coordinate plot showing the data subset selected by the Slice query of FIG. 9.

As was indicated in the example described for FIG. 4, all data subset point values coincident with imaginary line 84 (i.e. falling between slice-defining arrows 80 and 82) fall within a pair of bounding parallel lines in a Cartesian coordinate plot (see FIG. 10).

In essence, arrow 82 establishes a half space including and to the left of line 92 and arrow 80 establishes a half space including and to the right of line 90. The coincident half spaces which overlap between arrows 90 and 92 define the subset of data points that are identified by the Slice.

Figure 9:
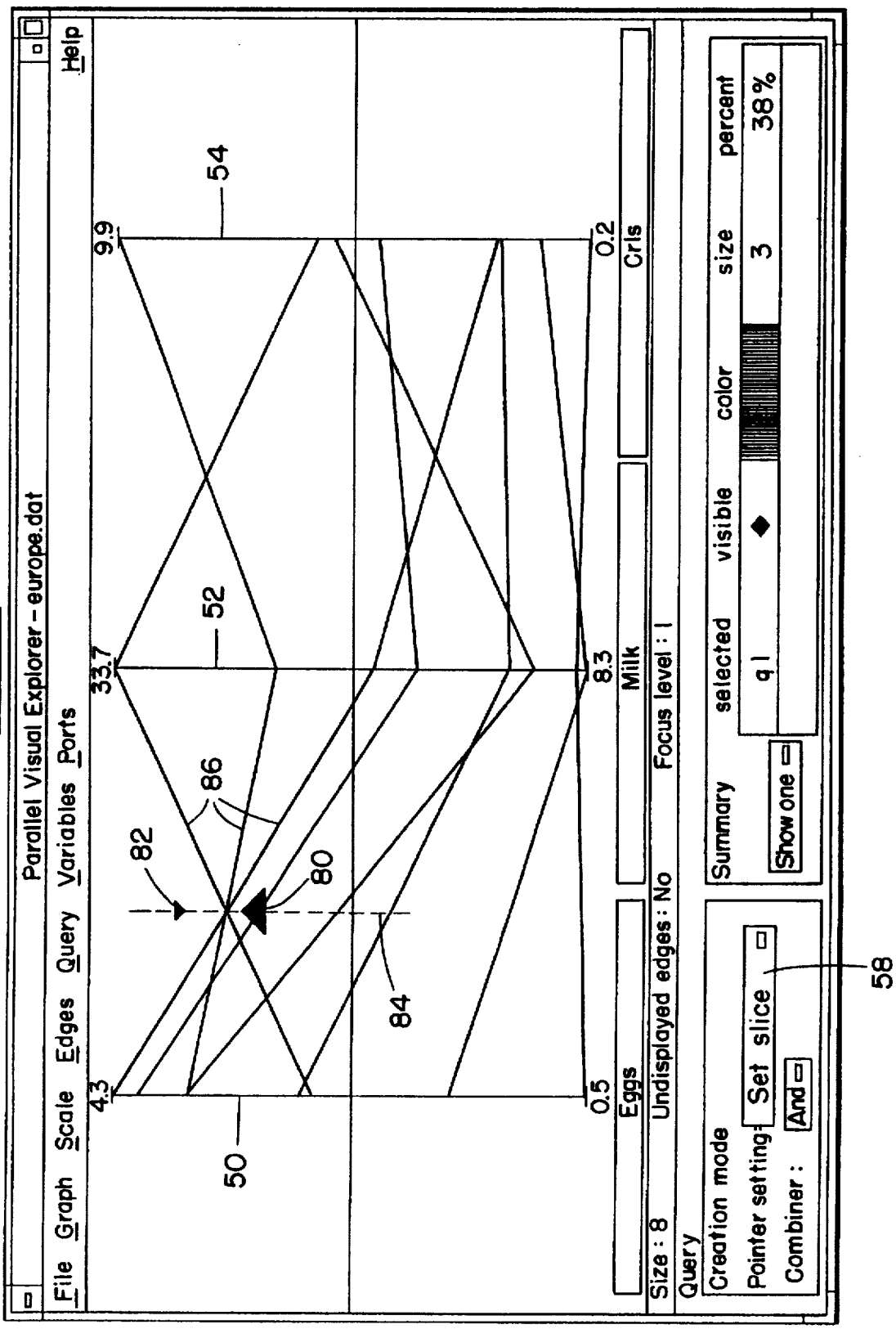
FIG. 9 is a display illustrating a portion of the parallel coordinate plot of FIG. 1 and shows a superimposed, user-initiated Slice query which selects a data subset from the displayed data set.

Because each of polygonal lines 86 in FIG. 9 intersect at a point coincident with imaginary line 84 (and between arrows 80, 82), it can be deduced that each of the data points represented by polygonal lines 86 lie on an imaginary line 94 (FIG. 10) which is parallel to half space defining lines 90 and 92. If additional polygonal lines cross between arrows 80 and 82 and do not intersect at the common point of polygonal lines 86, a data point in FIG. 9 would exist between lines 90 and 92 but would be non-coincident with imaginary line 94.

The slope of the bounding parallel lines 90, 92 is determined by the position of the imaginary line 84 vis-a-vis adjacent parallel coordinate axes 50 and 52 (in FIG. 9). In specific, as the position of imaginary line 84 approaches parallel coordinate 52, the slope of lines 90 and 92 in FIG. 10 becomes more negative with respect to axis 52'. By contrast, when imaginary line 84 approaches parallel coordinate axis 50, the slope of lines 90 and 92 become less negative with respect to axis 52'.

Mathematically, the Slice query can be represented by two equations which define lines 90 and 92 as follows:

$$C_1 X1 + C_2 X2 \leq C_0$$

$$C_1 X1 + C_2 X2 \geq B_0$$

where: $(C_1/Max(X1)-Min(X1))/C_2/(Max(X2)-Min(X2))) \neq 1$

WEDGE

Figure 11:
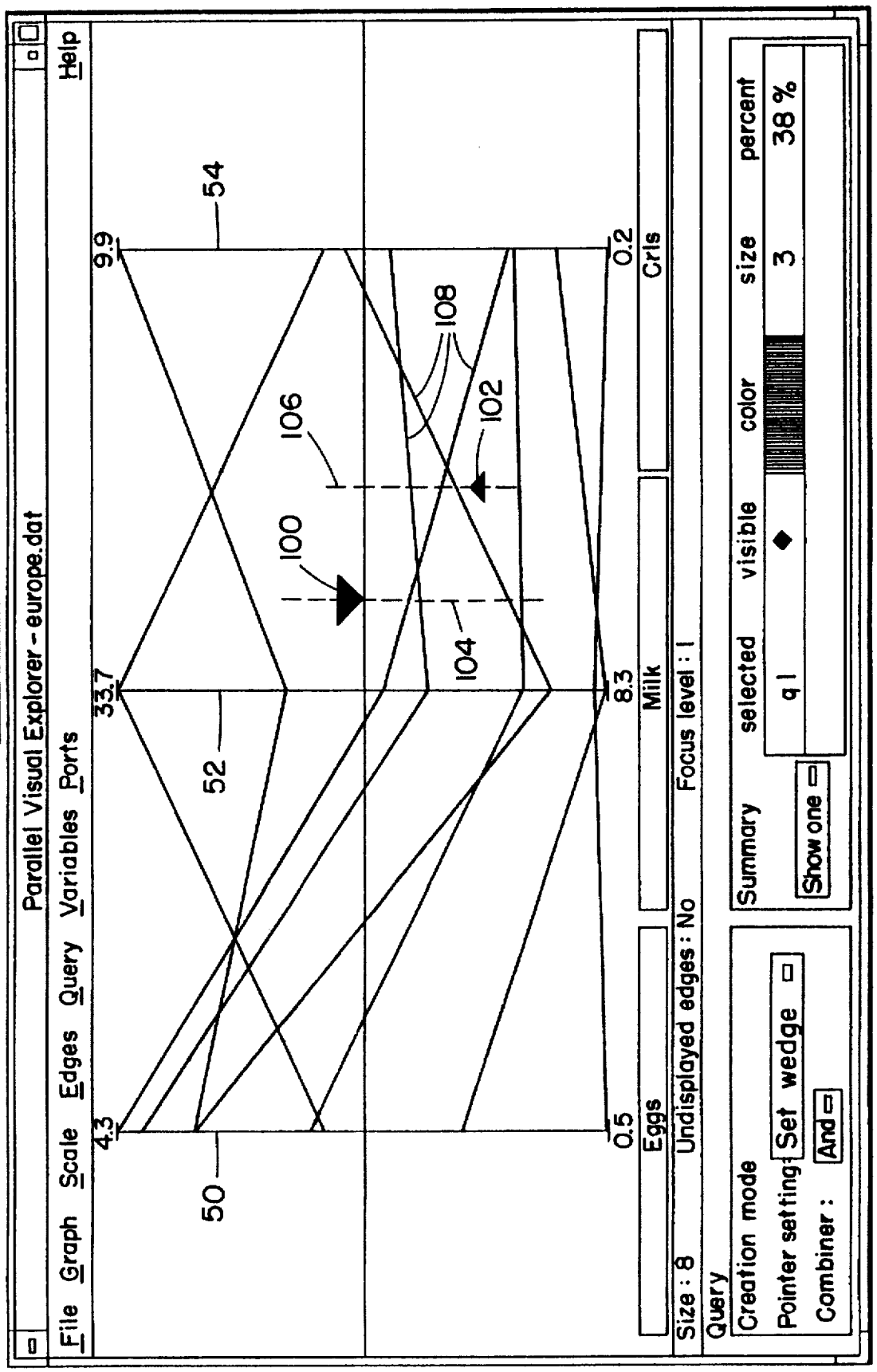
FIG. 11 is a display illustrating a portion of the parallel coordinate plot of FIG. 1 and showing a superimposed, user-initiated Wedge query which selects a data subset from the displayed data set.

In FIG. 11, a Wedge query is created when arrows 100 and 102 are set along imaginary lines 104 and 106 which are horizontally spaced from each other. The vertical spacing between arrows 100, 102 defines a range therebetween. The horizontal distance between imaginary lines 104 and 106 can be varied. Recall that a parallel coordinate at the tip of each of arrows 100 and 102 represents a line in the Cartesian coordinate system. Because arrows 100 and 102 do not lie on the same vertical imaginary line, the straight lines defined by their tips are not parallel in the Cartesian coordinate system (thus, the term "wedge"). As before, when the "set Wedge" function is enabled, polygonal lines which pass between the tips of arrows 100 and 102 are highlighted or otherwise emphasized.

Figure 12:
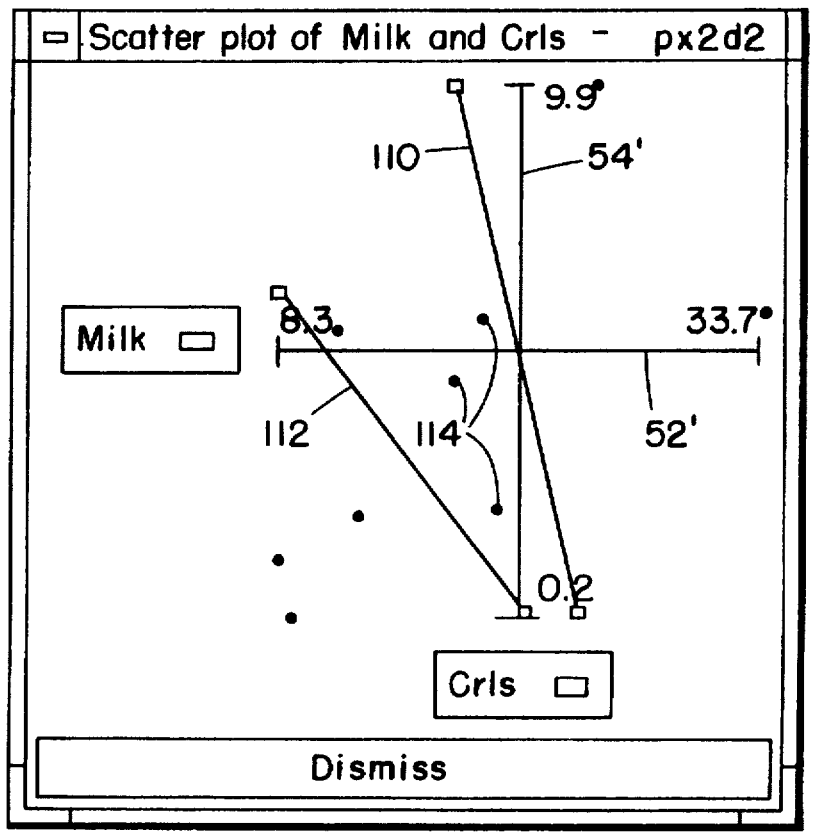
FIG. 12 is a Cartesian coordinate plot showing the data subset selected by the Wedge query of FIG. 10.

When the user selects the Cartesian coordinate mode, FIG. 12 is the result. Y axis 54' is representative of values on axis 54 in FIG. 11. Similarly, X axis 52' is equivalent to parallel coordinate axis 52 in FIG. 11. Line 110 and is identified by the value at the tip of arrow 100 in FIG. 11 and defines the right-most extent of a half space extending in a leftward direction therefrom. Line 112 is the line identified by the tip of arrow 102 in FIG. 11 and represents the leftmost extent of a half space extending rightwardly therefrom. The coincident regions of the half spaces created by lines 110 and 112 encompass data points 114 (which are equivalent to polygonal lines 108 in FIG. 11). It can thus be seen that by manipulation of arrows 100 and 102, a wide range of half spaces can be created to enable the viewing of a data subset in a Cartesian coordinate system. This function is only applicable to data points existing on and between a pair of adjacent axes in the parallel coordinate system (as the Cartesian coordinate system can only show the relationship between an independent variable and two dependent variables).

Mathematically, the wedge function can be represented as follows:

$$C_1 X1 + C_2 X2 \leq C_0$$

$$B_1 X1 + B_2 X2 \geq B_0$$

FLOW

The Flow query enables a user to select a data subset that is represented by a polygonal line in the parallel coordinate system, which polygonal line exhibits a slope in the parallel coordinate system that is within an angular limit defined by the Flow query. The Flow query is set by a user's positioning of arrows 120 and 124 along one of the parallel coordinate axes (e.g., 52), separated by a desired span. The tips of each of arrows 120 and 124 are connected by lines 126 and 128 to a point on an adjacent parallel coordinate axis (e.g., as is 50), preferably at its midpoint 130. Lines 126 and 128 thereby define an arc 132. Any polygonal lines (e.g., 134, 136) between parallel coordinate axes 50 and 52 whose slopes lie within arc 132 are thereby selected and are either highlighted or otherwise emphasized on the display.

Figure 14:
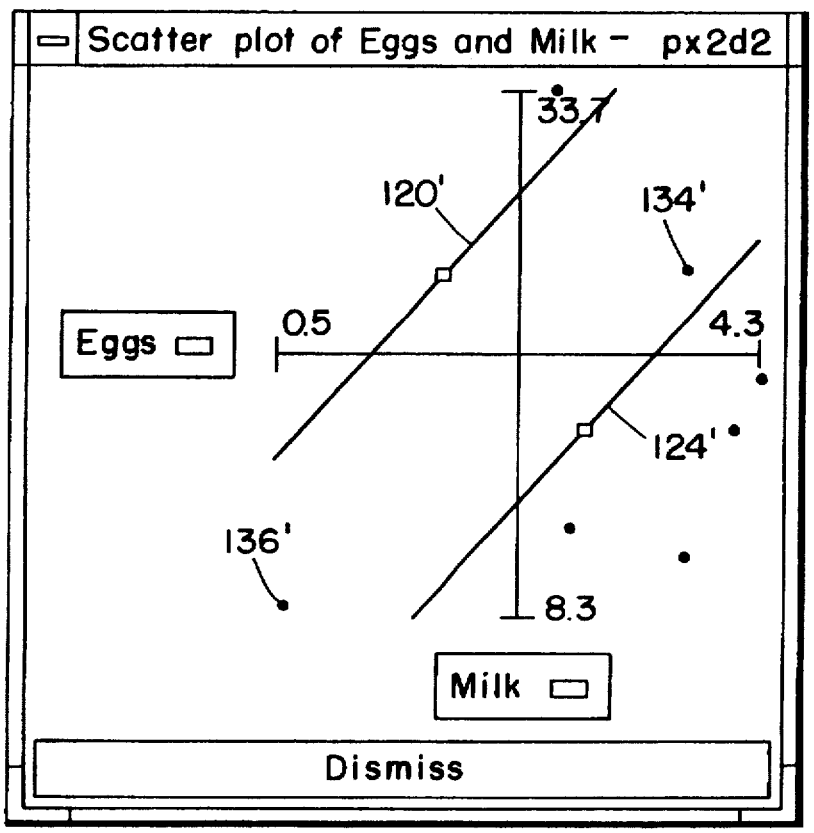
FIG. 14 is a Cartesian coordinate showing the data subset selected by the Flow query of FIG. 13.
Figure 13:
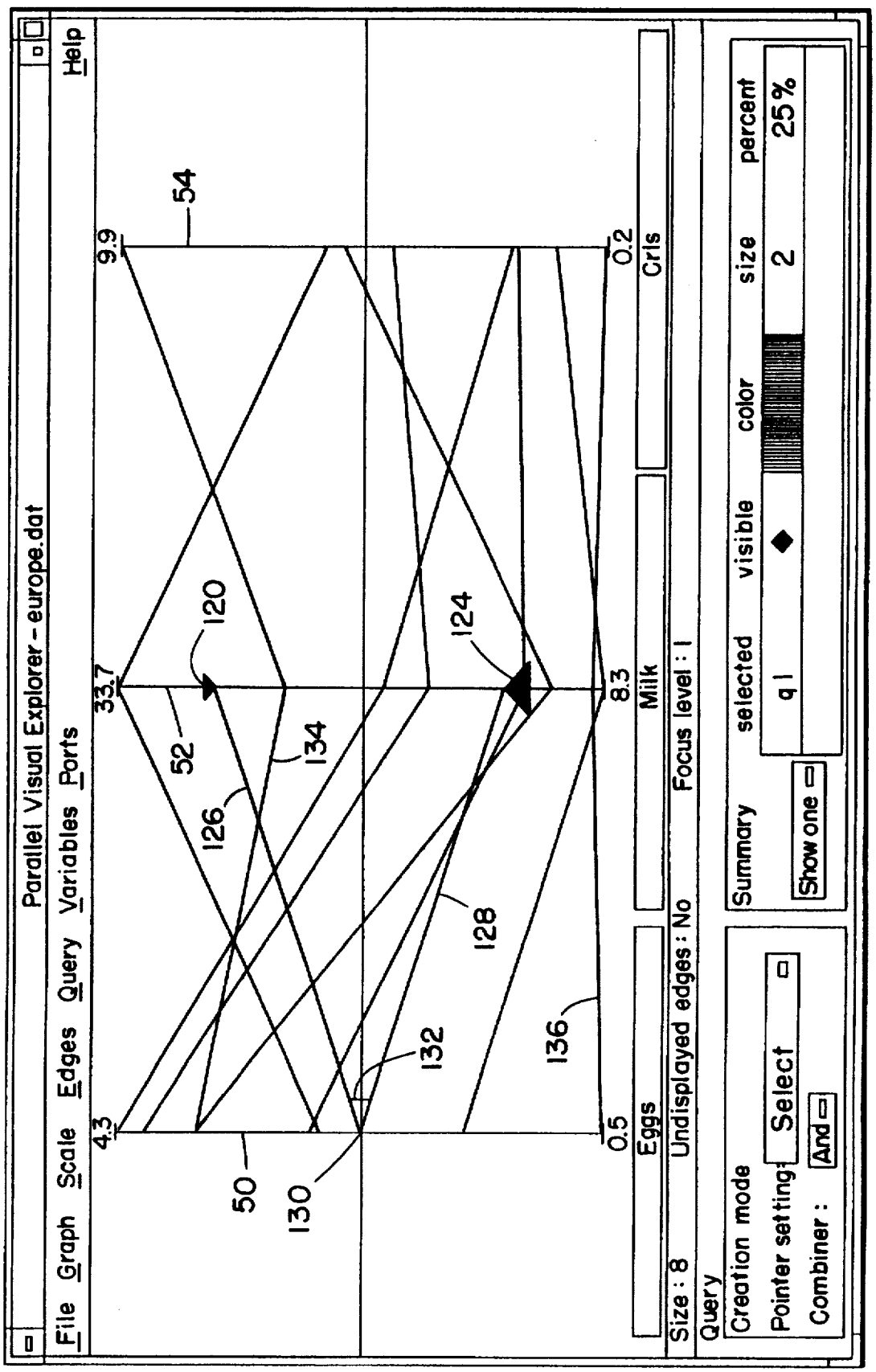
FIG. 13 is a display of a portion of the parallel coordinate plot of FIG. 1 and shows a superimposed, user-initiated Flow query to select a data subset from the displayed data set.

The corresponding Cartesian coordinate presentation of the flow query is shown in FIG. 14. Lines 120' and 124' are the lines that are defined by the parallel coordinates at the tips of arrows 120 and 124, respectively (along parallel coordinate axis 52). Because arrows 120 and 124 lie on parallel coordinate axis 52, it is known that their corresponding lines (120' 124') will be at an angle of 45° with respect to the origin in the Cartesian coordinate system. Because polygonal lines 134 and 136 in FIG. 13 evidence slopes within arc 132, their respective data points in FIG. 14 (134', 136') fall between half spaces defined by lines 120' and 124'.

The Flow query enables a user to identify independent variables which exhibit a similar slope in the parallel coordinate system between adjacent dependent variables. The mathematical representation of the Flow query is as follows:

$$C_1 X1 + C_2 X2 \leq C_0$$

$$B_1 X1 + B_2 X2 \geq B_0$$

where:

$C_1 = B_1$ $C_2 = B_2$ $C_1 + C_2 = 0$ $B_1 + B_2 = 0$

MISSING DATA VALUES

It may occur in the parallel coordinate display that no data value is specified for one or more parallel coordinate axes. In such case, the parallel coordinate procedure in memory 30 (FIG. 6) includes a default condition wherein a default data value is entered for such missing value. The default data value is calculated as 5% less than the minimum value plotted on corresponding the parallel coordinate axis. Thus, when a polygonal line is shown on the parallel coordinate presentation, the polygonal line extends below the bottom of the axis whose data value is missing. In such manner, the user can immediately determine the absence of the data value and take action to insert the value or ignore the portion of the polygonal line connecting to the default data value. The default data value can also be greater than the maximum value plotted on an axis.

OUTLIERS

An outlying data value is one which is at either extreme of a parallel coordinate axis. Thus, if any outlier data point exists on a parallel coordinate axis, the polygonal line for the independent variable will intersect the axis at that outlier data point. It is useful to detect outlier data points which are common to a number of independent variable. Such outlying data points for N variables may then be partitioned into groups based upon the combination of the N variables that exhibit such data points.

BOX QUERY

A parallel coordinate presentation, as indicated above, enables a user to visualize an interrelationship between an independent variable and multiple dependent variables. Parallel coordinate systems thus enable visualization of changes to an independent variable when certain dependent variables are altered. For instance, a parallel coordinate system may assign each parallel coordinate axis a set of variable values in accordance with specific aspects of a semiconductor process, all of which together affect a product's functional characteristics (the "product" being the independent variable). If plural products are plotted on the parallel coordinate system, a Range query superimposed on a variable axis will cause the highlighting of all polygonal lines passing within the range—thereby showing each of the products which exhibit the specific process variable within the selected range. The "box query" looks at a selection of remaining variables and determines which are the best predictors of the subset thereof that falls within the aforesaid selected range. In geometric terms, the box query constructs a multifaceted box having a number of faces that are equivalent to the number of predictor parallel coordinate axes.

The subset of data points in the box should ideally match the subset on which the box is constructed, but that does not always happen. Consider a subset of data points in two variables that are selected inside a circle. The tightest box that encloses the circle may contain data points outside the circle, but within the box. The parallel coordinate procedure orders the predictor variables relatively on the parallel of coordinate display such that the variable that weeds out the most undesired data points (points outside of the subset) is to the left, etc. More specifically, the most significant variable is plotted on the leftmost parallel coordinate of those coordinates on which predictor variables are plotted.

LOGICAL OPERATORS

The combination of a Query or Queries with a logical operator (or logical operators) can provide additional information regarding data plotted in a parallel coordinate system. For instance, application of a complement operator by CPU 22 to a Range query will cause all polygonal lines external to the range defined by the Range query to be highlighted or otherwise emphasized. Similarly, different Queries can be subjected to AND, OR Exclusive OR, etc. operators to enable further detailed analysis of the displayed data.

It should be understood that the foregoing description is only illustrative of the invention. Various alternatives and modifications can be devised by those skilled in the art without departing from the invention. For instance, while the invention has been described assuming that the queries are superimposed on the parallel coordinate system, such queries can also be superimposed on the Cartesian coordinate system (via the half-space defining lines) with the resultant arrows indicated on a corresponding parallel coordinate presentation. Further, while arrows are shown as the graphical delimiters, any appropriate icon can be substituted therefor. Accordingly, the present invention is intended to embrace all such alternatives, modifications and variances which fall within the scope of the appended claims.

What is claimed is:

1. A method for visualizing a multi-variate data set in a plurality of multi-dimensional presentations, said data set comprising a plurality of independent variables and for each independent variable, a plurality of dependent variables, said method performed by a computer having a graphical interface and user input means, said method comprising the steps of:

displaying said data set in parallel coordinate form on said graphical interface, so that each dependent variable of said data set is presented as a series of values along an axis, plural axes arranged in parallel, a polygonal line connecting values on said axes illustrating a relationship between said dependent variables and an independent variable;

superimposing on said graphical interface, through use of said user input means, graphical delimiters positioned on or between either of two adjacent parallel axes, said graphical delimiters identifying a data subset comprising at least one independent variable and dependent variables related thereto that are connected by a polygonal line extending between said adjacent parallel axes;

modifying a presentation of said polygonal line representing said data subset to differentiate said polygonal line from other polygonal lines representing remaining data subsets of said data set; and displaying said data subset identified by said graphical delimiters in an alternate coordinate form on said graphical interface, so that each dependent variable value of said data subset, connected by a differentiated polygonal line between adjacent axes of said parallel coordinate form, is represented by a point on a pair of orthogonally intersecting axes, and said independent variable is represented by a point in space that is an intersection of projections of said dependent variable values, and further displaying boundaries representative of a limit or limits established by said graphical delimiters.

2. The method as recited in claim 1, wherein said superimposing step causes said graphical delimiters to be superimposed and spaced apart on one said parallel axis of said parallel coordinate form, said data subset that is identified by said graphical delimiters being displayed on said graphical interface in said alternate coordinate form, said data subset delimited by opposed parallel boundaries, each boundary intersecting one said axis at a dependent variable value denoted by a graphical delimiter in said parallel coordinate form.

3. The method as recited in claim 1, wherein said superimposing step causes said graphical delimiters to be displayed on said graphical interface in a spaced apart manner, said data subset that is identified by said graphical delimiters displayed on said graphical interface in said alternate coordinate form and falling within two coincident half spaces, one half space including and positioned to one side of a first line whose coordinates in said alternate coordinate form are determined by coordinates of one said graphical delimiter in said parallel coordinate form, and a second half space including and positioned to a side of a second line that is opposed to said first line, said second line having coordinates in said alternate coordinate form that are defined by coordinates of a second of said graphical delimiters in said parallel coordinate form.

4. The method as recited in claim 3, wherein a first said graphical delimiter is positioned along a first line that is parallel to and spaced between parallel axes of said parallel coordinate form and a second said graphical delimiter is positioned along a second line that is parallel to and spaced between parallel axes of said parallel coordinate form.

5. The method as recited in claim 3, wherein said graphical delimiters are positioned along a first line that is parallel to and spaced between parallel axes of said parallel coordinate form.

6. The method as recited in claim 3, wherein said graphical delimiters are positioned along a first axis of said parallel coordinate form, and said first and second half spaces are further delimited by lines connecting each of said graphical delimiters to a dependent variable value on an adjacent parallel axis.

7. A computer system for visualizing a multi-variate data set in a plurality of multi-dimensional presentations, said data set comprising a plurality of independent variables and for each independent variable, a plurality of dependent variables, said computer system comprising:

means for displaying said data set in parallel coordinate form on said graphical interface, so that each dependent variable of said data set is presented as a series of values along an axis, plural axes arranged in parallel, a polygonal line connecting a value on each axis illustrating a relationship between said dependent variables and an independent variable;

user operated means for superimposing on said graphical interface, graphical delimiters and for positioning said graphical delimiters on or between either of two adjacent parallel axes, said graphical delimiters identifying a data subset comprising at least one independent variable and dependent variables related thereto that are connected by a polygonal line extending between said adjacent parallel axes;

means for modifying said graphical interface to alter a presentation of said polygonal line representing said data subset so as to differentiate said polygonal line from other polygonal lines representing remaining data subsets of said data set; and means for displaying said data subset identified by said graphical delimiters in an alternate coordinate form on said graphical interface, so that each dependent variable value of said data subset, connected by a differentiated polygonal line between said adjacent axes of said parallel coordinate form, is represented by points on a pair of orthogonally intersecting axes, and said independent variable is represented by a point in space that is an intersection of projections of each said dependent variable value, said means for displaying also showing boundaries representative of a limit or limits established by said graphical delimiters.

8. The computer system as recited in claim 7, wherein said user operated means causes said graphical delimiters to be superimposed and spaced apart on one said parallel axis of said parallel coordinate form, said data subset that is identified by said graphical delimiters thereby displayed on said means for displaying in said alternate coordinate form, said data subset delimited by opposed parallel boundaries, each boundary intersecting one said axis at a dependent variable value denoted by a graphical delimiter in said parallel coordinate form.

9. The computer system as recited in claim 7, wherein said user operated means causes said graphical delimiters to be displayed on said means for displaying, in a spaced apart manner, said data subset that is identified by said graphical delimiters displayed on said means for displaying in said alternate coordinate form and falling within two coincident half spaces, one half space including and positioned to one side of a first line whose coordinates in said alternate coordinate form are determined by coordinates of one said graphical delimiter in said parallel coordinate form, and a second half space including and positioned to a side of a second line that is opposed to said first line, said second line having coordinates in said alternate coordinate form that are defined by coordinates of a second of said graphical delimiters in said parallel coordinate form.

10. The computer system as recited in claim 9, wherein a first said graphical delimiter is positioned along a first line that is parallel to and spaced between parallel axes of said parallel coordinate form and a second said graphical delimiter is positioned along a second line that is parallel to and spaced between parallel axes of said parallel coordinate form.

11. The computer system as recited in claim 9, wherein said graphical delimiters are positioned along a first line that is parallel to and spaced between parallel axes of said parallel coordinate form.

12. The computer system as recited in claim 9, wherein said graphical delimiters are positioned along a first axis of said parallel coordinate form, and said first and second half spaces are further delimited by lines connecting each of said graphical delimiters to a dependent variable value on an adjacent parallel axis.

13. The computer system as recited in claim 7 wherein said means for displaying causes a substitute dependent variable value that is outside a range of dependent variable values plotted on an axis, to be juxtaposed to an extremity of said axis, when no value of said dependent variable is preassigned to an independent variable represented by a polygonal line, said polygonal line intersecting said substitute dependent variable value.

* * * * *